United States Patent Office 3,560,145
Patented Feb. 2, 1971

3,560,145
METHOD OF PREPARING RADIOACTIVE CYANATES LABELED WITH CARBON ISOTOPE $^{14}$C
Josef Ratusky and Richard Tykva, Prague, Czechoslovakia, assignors to Ceskoslovenska Akademie Ved, Prague, Czechoslovakia
No Drawing. Filed Sept. 26, 1967, Ser. No. 670,779
Claims priority, application Czechoslovakia, Sept. 28, 1966, 6,222
Int. Cl. C01c 3/00; C09k 3/00
U.S. Cl. 23—75
10 Claims

ABSTRACT OF THE DISCLOSURE

Radioactive cyanates labeled with carbon isotope $^{14}$C are produced by placing a non-radioactive cyanate into a radioactive carbon dioxide $^{14}CO_2$ atmosphere at a temperature sufficiently high to cause an exchange reaction by which $^{14}$C from $^{14}CO_2$ will change place with non-radioactive carbon of the cyanate starting material. The reaction temperature preferably will be at or above the melting point of the cyanate and generally between about 100° C. and 380° C.

BACKGROUND OF THE INVENTION

Labeled cyanates, in the contest of the present invention cyanates including a $^{14}$C atom, are one of the fundamental starting materials for the synthesis of other labeled $^{14}$C compounds, for instance for the synthesis of uracil $^{14}$C from the cyanate and beta-alanin, for the preparation of labeled urea $^{14}$C, N-carbamoyl $^{14}$C-aspartic acid, N-carbamoyl $^{14}$C ornithin and 5-amino-2-oxo-4-imidazolinecarbamide-2-$^{14}$C.

Conventionally, the cyanates of alkali metals labeled with the carbon isotope $^{14}$C are produced by a direct synthesis of the labeled cyanate. These conventional methods, particularly if relatively high specific activities are desired, are connected with great difficulties.

Such prior art methods of producing labeled cyanates based, for instance, on the synthesis of cyanate $^{14}$C from urea $^{14}$C and potassium carbonate followed by purification of the cyanate with silver nitrate (note Williams, D. L., Ronzio, A. R., J. Am. Chem. Soc. 74, 2407 (1952), Smith, L. H., Jr., J. Am. Chem. Soc. 77, 6691 (1953), and Libermann, I., Kornberg, A., J. Biol. Chem. 207, 911 (1954)) are rather complicated and connected with considerable difficulties. According to Haley, E. B., Lambooy, J. P., J. Am. Chem. Soc. 76, 2926 (1954) and Weed, E. L., Wilson, D. W., J. Biol. Chem. 183, 435 (1950), the process includes oxidation with potassium permanganate in the presence of copper (II) hydroxide.

It is an object of the present invention to provide a method of producing radioactive cyanates which can be carried out in a simple and economical manner and will not be subject to the drawbacks and difficulties of prior art methods.

SUMMARY OF THE INVENTION

According to the present invention the non-radioactive cyanate anion is reacted with radioactive carbon dioxide. The type of cation of the cyanate is of no consequence except, of course, that the cation of the cyanate should be so chosen as not to unfavorably affect the physical properties and stability of the cyanate, for instance its fusibility and the desired degree of thermal stability.

Thus, broadly, the method of the present invention may be carried out with any cyanate, however, preferably the cyanates of alkali metal or alkaline earth metals and most preferably sodium and potassium cyanate are subjected to the process of the present invention.

DESCRIPTION OF THE PREFERRED EMBODIMENTS

According to the present invention a non-radioactive cyanate, for instance potassium cyanate, is heated in a carbon dioxide atmosphere including a substantial proportion of $^{14}CO_2$ to a temperature sufficiently high to cause the exchange reaction between the non-radioactive carbon of the cyanate and the $^{14}$C of the carbon dioxide. Thereafter, the reaction product is cooled and the gaseous carbon dioxide which now will include a smaller proportion of $^{14}CO_2$ may be recovered, for instance by freezing. The separated radioactive cyanate may then be stored or further processed in conventional manner.

In order to have a large area of contact between the initial non-radioactive cyanate and the $^{14}CO_2$ containing carbon dioxide atmosphere, a preferred embodiment of the present invention provides for applying the non-radioactive cyanate in the form of a thin layer to a carrier which carrier, of course, must be inert with respect to the reactants at the reaction temperature.

For instance, a solution of the non-radioactive cyanate may be sprayed onto a sintered corundum carrier having a particle size of between 0.6 and 0.75 mm. and a porosity equal to 33.2% by volume. Such sintered corundum carrier has a surface of about 5000 cm.$^2$/g. In this manner a very large area of contact is provided between the cyanate and the carbon dioxide atmosphere and this will improve the exchange reaction.

After the reaction has been completed and a thin layer of radioactive cyanate labeled with carbon isotope $^{14}$C will have been formed on the sintered corundum carrier, the radioactive cyanate may be dissolved in a suitable solvent in which the cyanate is soluble and the carrier is insoluble, for instance water, followed by separation of the cyanate solution from the carrier, for instance by filtration. Upon subsequent evaporation of the solvent such as water, a residue consisting of the radioactive cyanate will be obtained.

Although the exchange reaction will take place at relatively low temperatures, a significant reaction rate will be achieved only at temperatures of at least about 100° C. Preferably, the reaction temperature will be sufficiently high so that the cyanate will be in molten condition and it has been found that the preferred reaction temperatures are generally within the range of between 300 and 380° C. The recovery of the carbon dioxide, including residual $^{14}CO_2$ is advantageously carried out by freezing at a temperature of —195° C. or below.

By proceeding in this manner, the exchange of $^{14}$C between the cyanate anion —CNO$^{(-)}$ and gaseous carbon dioxide $^{14}CO_2$ proceeds easily so that within a short period of time an equilibrium is reached. The exchange reaction is not connected with any chemical transformation of the cyanate or the carbon dioxide so that the separation of the two reactants, after completion of the exchange reaction, can be accomplished in a very simple manner, due to the fact that the carbon dioxide will be in gaseous condition and the cyanate will be solid upon cooling to ambient temperature.

Particularly when the exchange reaction is carried out at a temperature above the melting point of the respective cyanate, a statistical $^{14}$C exchange will take place within a period of a few minutes.

It is preferred to use an excess of $^{14}CO_2$ over that stoichiometrically required for a complete exchange since it is possible thereby to obtain a radioactive cyanate having a high specific activity, i.e., including a high proportion of $^{14}$C.

The specific activity of the radioactive cyanate will be proportional to the specific activity of the carbon dioxide, i.e., to the proportion of $^{14}CO_2$ in the carbon dioxide atmosphere and will furthermore depend on the available excess amount of $^{14}CO_2$ which in turn depends on the total amount of $CO_2$ and on the specific activity thereof. Preferably, the specific activity of the $CO_2$ will be as high as possible and the amount thereof will be between 3 and 4 times the stoichiometrically required amount for complete exchange of the carbon of the cyanate.

The carbon dioxide atmosphere which is reacted with the non-radioactive cyanate consists of a mixture and $^{14}CO_2$ and $^{12}CO_2$ whereby the ratio between radioactive and non-radioactive $CO_2$ is a measure of the specific activity thereof. During the exchange reaction, the ratio of $^{14}CO_2$ in the atmosphere is reduced so that the $CO_2$ which is recovered, for instance by freezing, will be of lower specific activity than the $CO_2$ which has been originally introduced as one of the reactants.

The residual $CO_2$ of such lowered activity can be easily recovered, for instance by freezing and, after replenishing the radio-activity of the $CO_2$ by introduction of additional $^{14}CO_2$, it may be used again for subsequent exchange reactions.

The radioactive cyanate obtained according to the present invention is of high purity as may be shown by an analytic determination of carbon and nitrogen, or by titration, or by infrared spectroscopy or by determining the level of radio-activity of the cyanate.

It is found by these determinations that the quality or purity of the radioactive cyanate labeled with $^{14}C$ which is obtained by the method of the present invention is practically the same as that of the non-radioactive cyanate used as starting material for the reaction.

The following examples are given as illustrative.

Example I 41 milligrams (0.5 mM., the abbreviation "mM." standing for "millimole") of potassium cyanate were placed into a glass reaction ampoule having a capacity of about 5 milliliters, whereupon 22 milligrams (0.5 mM.) of freeze dried carbon dioxide $^{14}CO_2$ having a radio-activity of 8.4 nCi. (the abbreviation "nCi." standing for "nanocurie" i.e. $10^{-9}$ curie) were added. The ampoule was then sealed and heated in an electrically heated tube to a temperature of about 450° C. for a period of 45 minutes. After cooling, the ampoule was opened by breaking the seal, and the carbon dioxide was recovered by freezing in fluid nitrogen whereupon its radio-activity was measured; the value (A) thereof was 4.3 nCi. The potassium cyanate was then analyzed by dissolving a sample thereof (41 milligrams) in 5 milliliters of 0.1 N sodium hydroxide solution and the carbonate ions precipitated with barium nitrate, the barium carbonate sediment filtered, and again the radio-activity was measured; the value (B) was 0.1 nCi. The filtrate was transferred into a device communicating via a drier with a freezing apparatus, which device was filled up with liquid nitrogen and acidified with diluted perchloric acid ($HClO_4$). The liberated $^{14}CO_2$ from the decomposed cyanate was then transported by means of bubbled-through nitrogen to a freezing apparatus and the radio-activity again measured; the value (C) thereof was 4.1 nCi and corresponded to that of the potassium cyanate labeled with carbon isotope $^{14}C$. In the solution, after expulsion of $^{14}CO_2$, the content of ammonium ($NH_3$) resulting from the cyanate decomposed by the acid, was determined by titration, by which method the reference value of the cyanate content was obtained which corresponded to the value of $^{14}C$ induced and was 2% lower than that of the cyanate used as a parent substance for the reaction. The sum of the determined radio-activity values (A plus B plus C) gave the resulting value of radio-activity induced in form of $^{14}CO_2$.

Example II

The reaction was carried out in the same manner as described in Example I with the exception that instead of $^{14}CO_2$ non-radioactive carbon dioxide was used for the reaction. The reaction product was analyzed as to the cyanate content and it was found out that the cyanate content had decreased by 1%. The same specimen was subject to spectral analysis in the infrared region and in comparison with the spectrum of the parent cyanate no differences were found; on the contrary, the resulting product according to the spectral analysis proved to be of higher purity than the parent cyanate.

Example III

The reaction was carried out in the same manner as described in Example II with the exception that the reaction temperature was kept at 335° C. and the heating period shortened to 10 minutes. The procedure and analyses were the same as in Example II. Also the resulting product corresponded to that described in Example II.

Example IV

The reaction was acrried out in the same manner as described in Example III with the exception that instead of non-radioactive carbon dioxide the isotope $^{14}C$ was used. The procedure as well as the reaction product were the same as described in Example I.

Example V

The reaction was carried out in the same manner as described in Example I with the exception that sodium cyanate was used instead of potassium cyanate. The procedure was the same as described in Example I. The pureness of the isolated sodium cyanate was analogous to that of the potassium cyanate from Example I.

Example VI

The reaction was carried out in the same manner as described in Example V with the exception that the parent cyanate was applied in a thin layer to a carrier weighing 700 mg. and consisting of sintered corundum as described further above. The procedure was the same as in Example I with the exception that after dissolving the reacted cyanate in water, the carrier was filtered off. The pureness of the reaction product was the same as described in Example I.

What is claimed as new and desired to be protected by Letters Patent is set forth in the appended claims:

1. A method of producing a radioactive cyanate labeled with carbon isotope $^{14}C$, comprising the steps of contacting said non-radioactive cyanate with radioactive carbon dioxide $^{14}CO_2$ at an elevated temperature of at least 100° C. so as to cause an exchange reaction to take place between at least some of the non-radioactive carbon of said cyanate and the $^{14}C$ from said radioactive carbon dioxide; then cooling the mass to at least ambient temperature and separating the thus formed solid radioactive cyanate from the residual $^{14}CO_2$.

2. A method as defined in claim 1, wherein said cyanate, while being contacted by said $^{14}CO_2$, is located on a support which is inert relative to the reactants at the reaction temperature.

3. A method as defined in claim 2, wherein said support is sintered corundum.

4. A method as defined in claim 2, wherein the formed radioactive cyanate is removed from said support by dissolution in a solvent in which said support is at least substantially insoluble.

5. A method as defined in claim 1, wherein said elevated temperature is at least equal to the melting point of said cyanate.

6. A method as defined in claim 1, wherein said elevated temperature is between about 300 and 450° C.

7. A method as defined in claim 1, wherein said cyanate is selected from the group consisting of alkali metal cyanates and alkaline earth cyanates.

8. A method as defined in claim 7, wherein said cyanate is selected from the group consisting of sodium and potassium cyanate.

9. A method as defined in claim 1, wherein said cyanate is contacted with an amount of $^{14}CO_2$ in excess of the amount thereof required for complete exchange of the carbon of said non-radioactive cyanate for $^{14}C$.

10. A method as defined in claim 9, wherein after completion of the exchange reaction residual $^{14}CO_2$ is recovered by freezing of the latter.

References Cited

FOREIGN PATENTS 1,099,504  2/1961  Germany _____ 252—301.1

OSCAR R. VERTIZ, Primary Examiner

H. S. MILLER, Assistant Examiner

U.S. Cl. X.R.

252—301.1